UNITED STATES PATENT OFFICE.

AUGUST BLANK AND WLADIMIR RODIONOW, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

ORANGE TO BROWN DYE.

951,048.

Specification of Letters Patent. Patented Mar. 1, 1910.

No Drawing. Application filed October 14, 1909. Serial No. 522,617.

*To all whom it may concern:*

Be it known that we, AUGUST BLANK and WLADIMIR RODIONOW, chemists, citizens of, respectively, Germany and Russia, residing at Leverkusen, near Cologne, Germany, have invented new and useful Improvements in New Dyestuffs, of which the following is a specification.

We have found that new and valuable dyestuffs are obtained by treating with hetero cyclic amins the known dyestuffs which can be obtained by treating paranitro-toluene sulfonic acid with caustic soda lye. These dyestuffs are known in commerce as curcumin S, direct yellow, sun yellow etc. They are chemically azoxystilbene disulfonic acid or azoazoxydistilbene disulfonic acid. (Green, *Journal of Chemical Society* 89 p. 1610).

The new dyestuffs thus obtained are after being dried and pulverized brownish powders soluble in water with from a yellow to brown color and dyeing unmordanted cotton from yellow to orange to brown shades which are distinguished by their excellent fastness to light and their fastness to oxidizing agents.

Example: Direct yellow (azoazoxydistilbene disulfonic acid) obtained from 70 parts by weight of para-nitro-toluene sulfonic acid (sodium salt) is stirred up with water and 29.5 parts of dehydrothiotoluidin sulfonic acid ($NH_4$ salt), 50 parts of 30 per cent. caustic soda lye and 1000 parts of water are added. The resulting mixture is then heated to boiling for 20 hours in a vessel provided with a reflux condenser and a stirrer. The solution is neutralized with mineral acid and the dyestuff is precipitated with salt. It is after being dried and pulverized a yellowish-brown powder which is soluble in water with an orange color, and which is soluble in concentrated sulfuric acid with a bluish-red color being precipitated in the shape of orange flakes by the addition of water. It dyes unmordanted cotton orange shades.

Other hetero cyclic amins may be used *e. g.* dehydrothioxylidin sulfonic acid, primulin sulfonic acid, xylidin-primulin-sulfonic acid, etc.

We claim:

1. The herein described new dyestuffs obtainable by condensing with hetero cyclic amins the dyes which are produced by treating paranitrotoluene sulfonic acid with caustic soda lye, which dyestuffs are after being dried and pulverized brownish powders soluble in water with an orange to brown color and dyeing unmordanted cotton from orange to brown shades fast to light and to the action of oxidizing agents, substantially as described.

2. The herein described new dyestuff obtainable by condensing direct yellow with dehydrothiotoluidin sulfonic acid, which dyestuff is after being dried and pulverized a yellowish-brown powder, which is soluble in water with an orange color, soluble in concentrated sulfuric acid with a bluish-red color, being precipitated in the shape of orange flakes from such a solution by addition of water and dyeing unmordanted cotton orange shades, substantially as described.

In testimony whereof we have hereunto set our hands in the presence of two subscribing witnesses.

AUGUST BLANK. [L. S.]
WLADIMIR RODIONOW. [L. S.]

Witnesses:
OTTO KÖNIG,
CHAS. J. WRIGHT.